United States Patent [19]

Welygan et al.

[11] Patent Number: 4,634,485

[45] Date of Patent: Jan. 6, 1987

[54] EXTRUDED ARTICLE AND METHOD OF MAKING THE SAME

[75] Inventors: Dennis G. Welygan; Ronald O. Zemke, both of St. Paul, Minn.

[73] Assignee: Minnesota Mining and Manufacturing Company, St. Paul, Minn.

[21] Appl. No.: 768,803

[22] Filed: Aug. 23, 1985

Related U.S. Application Data

[62] Division of Ser. No. 550,641, Nov. 15, 1983, abandoned.

[51] Int. Cl.$^4$ .............................................. B32B 31/00
[52] U.S. Cl. .............................. 156/244.11; 264/167; 264/177.1
[58] Field of Search .................... 264/167, 173, 177 R; 156/244.11

[56] References Cited

U.S. PATENT DOCUMENTS

| | | | |
|---|---|---|---|
| 2,606,133 | 8/1952 | Havens | 428/186 X |
| 2,769,481 | 11/1956 | Meanor et al. | 428/186 X |
| 2,919,467 | 1/1960 | Mercer et al. | 18/12 |
| 3,019,147 | 1/1962 | Nalle, Jr. | 154/46 |
| 3,070,840 | 1/1963 | Mercer | 18/12 |
| 3,089,804 | 5/1963 | Gutieuez | 264/167 |
| 3,112,184 | 11/1963 | Hollenbach | 428/186 X |
| 3,178,328 | 5/1965 | Tittmann | 156/167 |
| 3,247,039 | 4/1966 | Schultheiss | 156/167 |
| 3,270,370 | 9/1966 | Mercer | 18/12 |
| 3,291,879 | 12/1966 | Martin | 264/167 |
| 3,372,920 | 3/1968 | Corbett et al. | 264/173 |
| 3,404,748 | 10/1968 | Bjorksen | 428/105 X |
| 3,551,236 | 12/1970 | Fairbanks | 156/167 |
| 3,551,543 | 12/1970 | Mercer et al. | 264/167 |
| 3,553,069 | 1/1971 | Rasmussen | 16/143 |
| 3,577,587 | 5/1971 | Fairbanks | 18/12 |
| 3,621,528 | 11/1971 | Fairbanks et al. | 18/12 N |
| 3,630,816 | 12/1971 | Parker | 161/72 |
| 3,673,032 | 6/1972 | Komoly | 26 X/167 X |
| 3,741,857 | 6/1973 | Kakutani et al. | 264/167 X |
| 3,932,092 | 1/1976 | Hureau et al. | 425/382 |
| 3,932,106 | 1/1976 | Vogts | 425/505 |
| 4,102,720 | 7/1978 | Kaneko et al. | 428/186 X |
| 4,143,195 | 3/1979 | Rasmussen | 428/116 |
| 4,227,350 | 10/1980 | Fitzer | 51/295 |
| 4,267,223 | 5/1981 | Swartz | 428/183 X |
| 4,311,746 | 1/1982 | Chavannes | 428/186 X |
| 4,329,392 | 5/1982 | Bronner | 428/296 |
| 4,332,757 | 6/1982 | Blackmon et al. | 264/103 |
| 4,342,807 | 8/1982 | Rasen et al. | 428/180 |
| 4,351,147 | 9/1982 | Blackmon et al. | 57/208 |
| 4,353,956 | 10/1982 | Nalle | 428/255 |
| 4,376,743 | 5/1983 | Dees | 264/103 |
| 4,384,022 | 5/1983 | Fowler | 428/296 |
| 4,384,842 | 5/1983 | Cavalli | 425/463 |
| 4,419,315 | 12/1983 | Kessler | 264/167 X |

FOREIGN PATENT DOCUMENTS

| | | |
|---|---|---|
| 43-22339 | 1/1968 | Japan. |
| 836556 | 6/1960 | United Kingdom. |
| 1020889 | 2/1966 | United Kingdom ............ 428/186 |

*Primary Examiner*—Nancy A. Swisher
*Attorney, Agent, or Firm*—Donald M. Sell; James A. Smith; Richard Francis

[57] ABSTRACT

An article is provided comprising a plurality of straight spaced parallel extruded elements separated by a regularly undulated extruded element having an aspect ratio of at least about two, with undulations having opposed apexes on either side thereof, with apexes on one side of the undulated element being bonded to one of the parallel extruded elements and the apexes on the other side of the undulated element being bonded to the other of said parallel extruded elements. The article is formed by extruding a first filament-forming extrudable plastic mass to form a plurality of straight spaced continuous parallel elements, extruding (at a faster extrusion rate and between adjacent parallel elements) a second filament-forming extrudable plastic mass to form an undulatable element which is thinner than it is wide to provide a cross-section with an aspect ratio of at least about two, causing the undulatable element to undulate in its thin dimension and to bond to the straight spaced continuous parallel elements, and changing or permitting the change of the formed, extruded plastic mass so that subsequent bonding will no longer occur and so that the elements have sufficient structural integrity to maintain their extruded bonded shape.

18 Claims, 26 Drawing Figures

ND METHOD OF
EXTRUDED ARTICLE AND METHOD OF MAKING THE SAME

This is a division of application Ser. No. 550,641 filed Nov. 10, 1983, now abandoned.

DESCRIPTION

1. Technical Field

The present invention relates to the formation by extrusion of an article having a plurality of straight parallel elements separated by an undulated element.

2. Background Art

Various three-dimensional plastic networks find utility in a wide variety of applications. For example, a three-dimensional web which may be formed of crimped staple fibers adhered together at points of contact or of extruded, autogenously bonded, continuous filaments may be employed as the structural element of a non-woven abrasive pad or article. Additionally, the same fiber or filament structures and other three-dimensional open plastic networks such as reticulated foams may be employed as filters, mats for cushioning, wiping, or any of a wide variety of other uses.

Various methods of making three-dimensional structures of various materials such as plastics are known in the art. U.S. Pat. No. 4,332,757 (Blackmon) discloses the preparation of a textured continuous filament yarn made by combining molten streams of polymer in a side-by-side configuration with one stream at a higher speed than the other to create a yarn with a false twist.

Fowler (U.S. Pat. No. 4,384,022) assigned to the assignee of the present application, discloses a filamentary structure comprising a thermoplastic core filament extending in successive turns of a spiral and thermoplastic sheath filaments which extend linearly generally in the direction of the axis along the outside of the spiral. The structure formed by this disclosure, however, cannot include a core filament having an aspect ratio much greater than one in order to maintain the spiral.

Tittmann (U.S. Pat. No. 3,178,328) discloses a process and apparatus for producing a plastic net utilizing a die having an oscillating portion to extrude linear filaments together with oscillating filaments to create a sine wave in the oscillating filaments thereby creating net-like structure. Tittmann's disclosure fails to indicate that anything other than a flat plastic net may be produced.

DISCLOSURE OF THE INVENTION

The present invention provides a unique extruded article comprising a plurality of linear spaced parallel extruded filaments separated by a regularly undulated extruded element having an aspect ratio of at least about two. The undulations have opposed apexes on either side thereof with apexes on one side of the undulated elements being bonded initially without adhesive to one of the parallel extruded elements and the apexes on the other side of the undulated element being bonded to the other parallel extruded element.

The article is formed by the following steps:

(1) extruding at a first rate a first filament-forming, extrudable plastic mass to form a plurality of straight spaced parallel elements;

(2) extruding (at a second rate faster than the first extrusion rate and between adjacent spaced, continuous parallel elements) a second filament-forming extrudable plastic mass to form an undulatable element which is thinner than it is wide to provide a cross-section with an aspect ratio of at least about two, with the undulatable element being positioned with each opposite face of its wide dimension facing one of the straight continuous parallel elements and wherein the plastic masses have a tacky first physical state which permits the elements to bond to one another at points of mutual contact and a second physical state in which subsequent bonding will no longer occur and in which latter state the elements have sufficient structural integrity to maintain their extruded bonded shape;

(3) while the elements are sufficiently tacky to cause bonding therebetween at points of contact, causing the undulatable element to undulate in its thin dimension by permitting contact between a parallel element on one side of the undulatable element while maintaining the other adjacent parallel element in sufficiently close proximity to permit subsequent contact between it and the undulating undulatable element and to permit repetition of such undulation and subsequent contact, thereby providing an article having an undulated element with apexes aligned on opposed sides wherein the apexes on one side of the undulated element are bonded to one of the parallel elements and the apexes on the other side of the undulated element are bonded to the other adjacent parallel element; and (4) changing or permitting the change of the plastic masses to the second physical state.

The first and the second filament-forming extrudable plastic masses may have the same or different composition and may be extruded from different extrusion openings in the same extrusion die.

As used herein, the term "filament-forming extrudable plastic mass" refers to a substance having a viscosity which permits it to be extruded as a filament, ribbon, film or the like from an extrusion orifice and, upon extrusion, will have sufficient cohesiveness to maintain its extruded shape for a finite period of time to permit subsequent process steps. Examples of substances which will provide a filament-forming extrudable plastic mass for use in the present invention include:

(a) Synthetic thermoplasic resins capable of melt extrusion or compression extrusion in a molten state through dies and settable on cooling after extrusion. Readily obtinable suitable thermoplastic materials include polyamides or super polyamides (e.g., nylon), polyesters, vinyl polymers (e.g., vinyl acetate polymers), vinyl chloride polymers, polyvinyl chloride and copolymers thereof with other ethylenically unsaturated monomers such as vinyl acetate, vinylidene chloride, and like monomers, polyethylene, polypropylene, and the like polyolefin polymers, and polystyrene.

(b) Natural and synthetic rubbers, subsequently vulcanized or containing vulcanizing agents.

(c) Thermosetting plastic materials or mixtures thereof with thermoplastic materials, which are capable of extrusion in a liquid or semi-liquid state.

(d) Natural and synthetic fiber-forming materials extruded from solvent solution, such as cellulose or protein material, cellulose acetate, acrylate polymers, as well as many thermoplastic resins as mentioned above, dissolved or dispersed in a solvent and capable of extrusion and setting by drying (e.g. by solvent evaporation), immersion in or spraying with a coagulant as the plastic mass emerges from the dies.

(e) Blends such as masses which may include pulverized foodstuffs, dissolved or molten foodstuffs such as sugar-based mixtures which on setting form solid or resilient candy.

(f) Foamable compositions containing any of the above materials.

(g) Any other plastic masses which may be extruded through a die to form filaments.

BRIEF DESCRIPTION OF DRAWING

The invention may be more clearly understood by reference to the drawings, wherein.

DETAILED DESCRIPTION OF THE INVENTION

Figure 1:
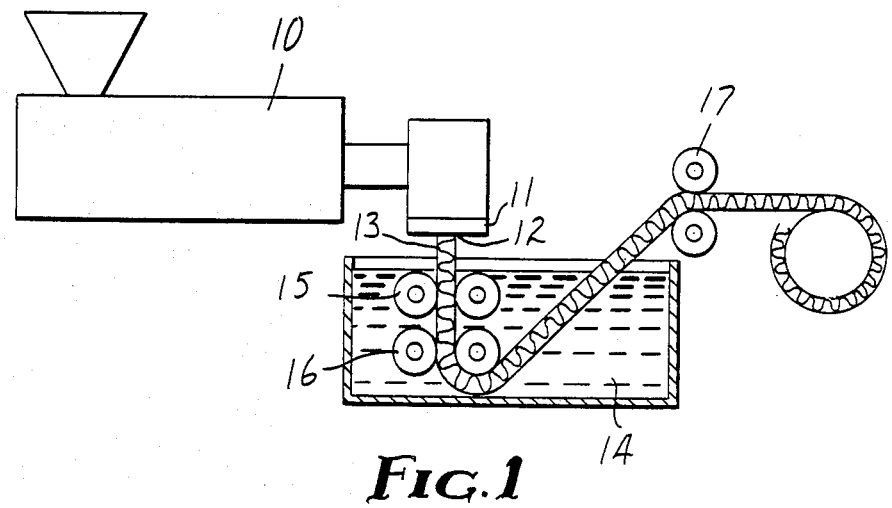
FIG. 1 is a side elevational view of an extrusion apparatus for carrying out the method of the present invention located over a tank of cooling medium and having associated therewith apparatus for removal of the extruded web from the cooling medium.
Figure 3:
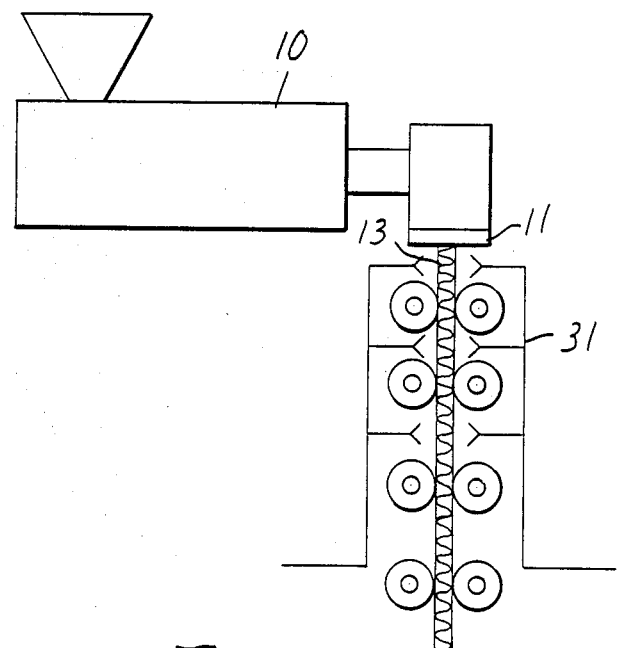
FIGS. 3 and 4 are side elevation views of alternative extrusion apparatus for practicing the method of the invention.
Figure 4:
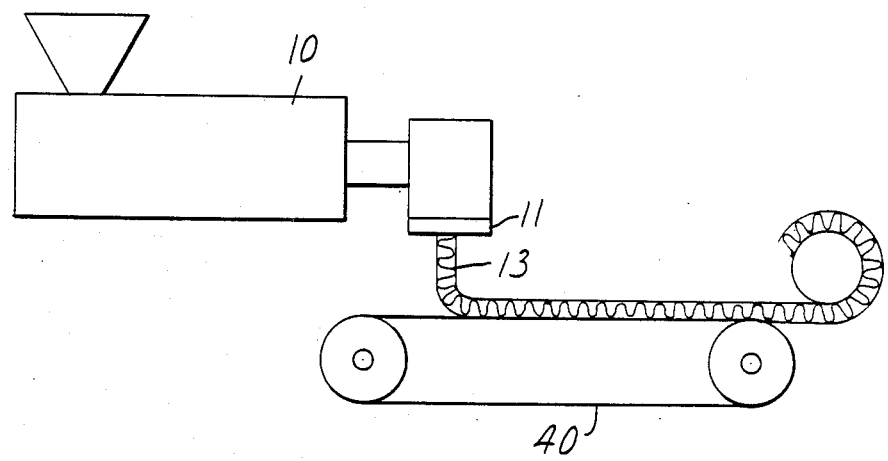

As shown in FIG. 1, a filament forming, extrudable plastic mass is extruded by extruder 10 (where the extruded substance may be rendered plastic) from extruder die 11 which has the appropriate extruder orifices 12 to form substantially continuous extruded web 13. Various methods of handling extruded web 13 are possible as depicted in FIGS. 1, 3 and 4. As shown in FIG. 1, the extruded web may be fed into quench bath 14 containing a suitable quenching medium such as water and guided therein by idler roll sets 15 and 16 and removed therefrom by passing between idler roll set 17 after which it could be wound for storage or incorporated directly into a product.

As shown in FIG. 3, it is also possible to maintain the extruded web in a straight configuration employing an air or water spray quench chamber 31 fitted with appropriate idler rolls sets. Furthermore, as depicted in FIG. 4, the extruded web may be deposited onto a continuous cooling belt 40 which is preferably porous to provide dissipation of heat and passage of forced air, if desired.

Figure 2:
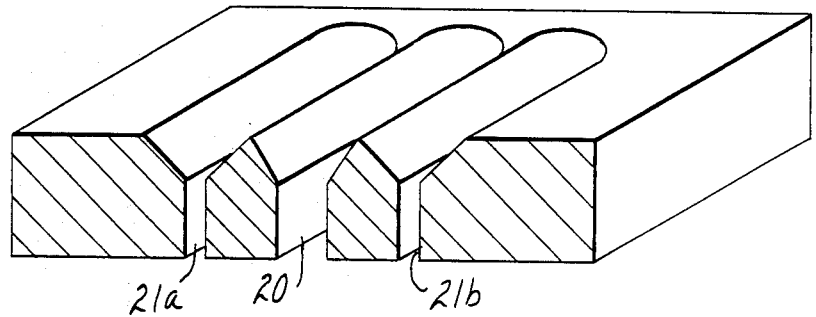
FIG. 2 is a perspective view, in section, of a slot die which may be utilized in the extrusion apparatus depicted in FIG. 1.
Figure 9:
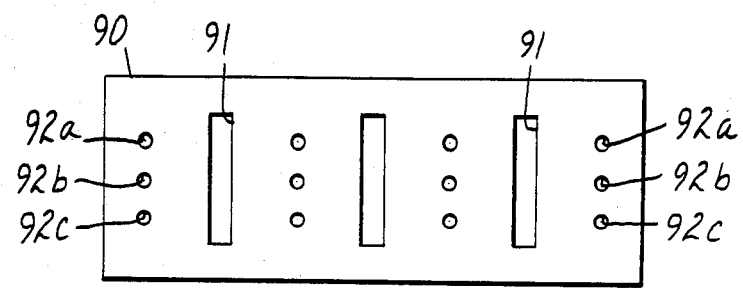
FIGS. 9-23 depict exemplary alternative extruder die opening arrangements capable of producing extruded articles according to the present invention.

FIG. 2 depicts a typical extruder die having three slot-like openings and being tapered on the inlet side around each opening. A central opening 20 is a wider slot than outer openings 21a and 21b. It should be noted that slot 21a could comprise a series of openings each of which may be round as depicted in FIG. 9 and central opening 20 may also comprise a series of openings but they should be more closely spaced so as to produce filaments which touch one another along their length so that they coalesce as they are extruded to form a ribbon-like structure.

Wider center opening 20 is spaced within narrower openings 21a and 21b to produce a velocity of flow of the filament-forming extrudable plastic mass so that the element extruded from center opening 20 flows faster than the elements extruded through openings 21a and 21b. Appropriate spacing of openings, contact between the central extruded element emitting from opening 20 and an adjacent element (e.g., the element extruded from opening 21a) and then the element extruded from the other adjacent opening produces a regular folded structure. The faster moving center element extruded from opening 20 tends to fold back and forth or oscillate between slower moving elements extruded from openings 21a and 21b.

The faster moving center element at some point after exiting the die will attach itself to one of the outer elements. The attachment by necessity retards the flow of the center element and causes a buckling or bunching of the central element, causing it to bend toward the other slower moving outer element. This motion repeats itself in a regular oscillatory fashion. The difference in velocity between the extruded elements results in the central element bending back and forward in a regular manner and frequency. In the case of typical thermoplastic materials, a contact bond is formed when the two tacky surfaces touch each other sequentially during the process and, by quenching the tacky material in an appropriate manner, the thermoplastic material is frozen in this zig-zag structure.

Figure 5:
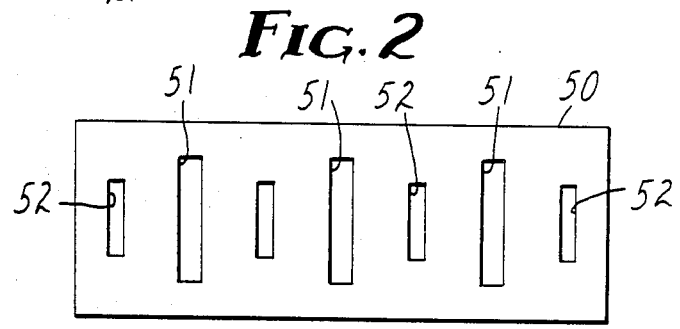
FIG. 5 is a representation showing the openings in an extrusion die of the type which is useful for preparing the article of the present invention and practicing the method of the present invention.
Figure 6:
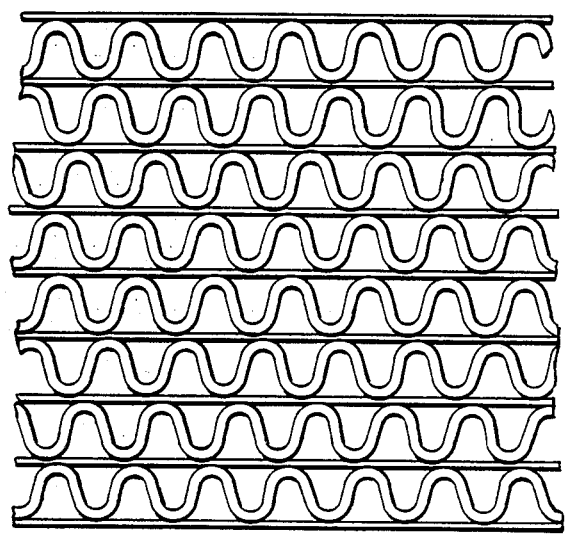
FIG. 6 is a top plan view of an extruded article according to the present invention made employing an extrusion die of the type depicted in FIG. 5 with additional openings of the type shown.

It is possible to interconnect a series of such elements by employing, for example, a die of the type depicted in FIG. 5 to produce a web of the type depicted in FIG. 6. The die, of course, would have appropriate openings sufficient to produce a web of the desired width.

It is also possible to control the loft of the extruded web by the dimension of the wider opening (by increasing the length of the slot for example), while the openness of the web can be controlled by the spacing of the slots and the take-up speed of the collector.

The process of the present invention depends upon the regular folding action of the undulatable element between the two adjacent straight elements as extrusion is accomplished. The regular folding action of the undulatable element is thought to be a result of the difference in bending moments that results from the undulatable element's dimension. The undulatable element has a cross-section with a width which exceeds its thickness to provide an aspect ratio that exceeds about 2:1. If the aspect ratio were approximately 1, the undulatable element would bend any direction rather than provide a symmetric element. U.S. Pat. No. 4,384,022 discloses a method of making an extruded article wherein a faster moving extruded element is extruded between slower moving straight elements to produce a spiral shape because the faster moving element has aspect ratio approximately 1. In the present case, bending of the undulatable element occurs in the thinnest dimension and folding rather than helical bending and turning becomes the dominant mode. By substantially increasing the aspect ratio, structures not easily possible to produce by such a simple extrusion process are now available.

Typical aspect ratio values for articles produced according to the present invention fall in the range of about 4:1 to 10:1. It is, however, possible to produce articles when an aspect ratio is as high as 100, even 1000.

Various modifications of extruded structures obtained by the present invention depend substantially upon the extrusion slot dimensions and the means by which differential flow is achieved. The process requires that the undulatable element be extruded faster than the straight elements. This may be accomplished, for example, by modification of the dimensions of the extrusion orifices, the extrusion die (for example, by variation of the path length within the die) or by employing a multi manifold die with independent flow control for the undulatable element and for the straight elements. The first method, that utilizing different orifice sizes to achieve differential flow, is the simplest and preferred method of the present invention.

Table I below sets forth some typical extruder orifice dimensions which may be employed for the production of an extruded article, the aspect ratios, and calculated slot width ratios based upon the ratio of the width of the major orifice to the width of the minor orifice which provides an indication of differential flow between the major and minor orifices.

elements upon first attempt. Rather, the undulatable element may simply sag between one straight element in a caternary-type loop, indicating that the spacing between the undulatable element and the straight element is too wide. The frequency of oscillation may also be determined by the flow ratio for a given slot spacing.

For a die of the type depicted in FIG. 9, the size of the orifices is dependent upon the number of holes so as to achieve the appropriate differential flow. If fewer orifices are selected, generally larger holes are required to set up the appropriate flow rate. The number of orifices required is not critical. The structure may be formed with one filament on either side of the undulatable element orifice because a single filament is capable of retarding the flow and causing the associated oscillating motion in the undulatable element. However, greater stability from twisting may be achieved by using a minimum of two filaments on a side. Any additional number of holes may be added, however. Symmetrical spacing of the holes is preferred but not mandatory. Symmetrical spacing is preferred when employing a single (or even double) filament to minimize any twisting motion of the undulatable element and for a ribbon-like narrow band straight element. Centering of the die opening which produces the undulatable element between the openings which produce the straight elements is preferred but not required. The width of the ribbon-like straight element is not critical to the formation process.

FIGS. 5 and 9–23 show examples of various configurations of dies having openings capable of extruding the extruded article of the present invention.

FIG. 5 shows a die 50 having rectangular openings 51 for extruding the undulatable element positioned between smaller rectangular openings 52 for extruding straight spaced parallel extruded elements.

FIG. 9 shows a die 90 having rectangular openings 91 for extruding the undulatable element positioned between hole groups including holes 92a, 92b and 92c which are aligned with their centers along an axis which is parallel to and spaced between openings 91.

TABLE I

| FOLDED RIBBON STRUCTURE DIE DIMENSIONS | | | | | | |
|---|---|---|---|---|---|---|
| Major Slot Width (mm) | Minor Slot Width (mm) | Hole Diameter (mm) | Slot Height (mm) | Slot Spacing (mm) | Aspect Ratio | Slot Width Ratio |
| 1.27 | | 1.32 | 7.92 | 15.90 | 6.24 | 0.96[1] |
| 1.07 | | 0.94 | 4.75 | 12.70 | 4.45 | 1.13[1] |
| 1.02 | | 1.07 | 7.92 | 7.92 | 7.80 | 0.95[1] |
| 0.76 | | 0.94 | 7.92 | 12.70 | 10.40 | 0.81[1] |
| 0.76 | | 1.07 | 7.92 | 7.92 | 10.40 | 0.71[1] |
| 0.76 | | 1.07 | 7.92 | 6.35 | 10.40 | 0.71[1] |
| 0.76 | 0.51 | | 7.92 | 6.35 | 10.40 | 1.5[2] |
| 0.51 | | 0.64 | 4.75 | 3.18 | 9.35 | 0.80[1] |
| 0.41 | | 0.46 | 1.57 | 1.57 | 3.87 | 0.88[1] |
| 0.25 | | 0.33 | 1.02 | 1.57 | 4.00 | 0.77[1] |
| 0.15 | | 0.23 | 0.76 | 1.57 | 5.00 | 0.66[1] |
| 0.51 | 0.38 | | 50.80 | 50.80 | 100.00 | 1.33[2] |
| 0.51 | | 0.66 | 50.80 | 4.57 | 100.00 | 0.77[1] |
| 1.02 | | 0.61 | 2.03 | 6.35 | 2.00 | 1.6[1] |
| 1.02 | | 0.61 | 2.16 | 7.92 | 2.12 | 1.6[1] |

[1] Major slot width/hole diameter.
[2] Major slot width/minor slot width.

Figure 8:
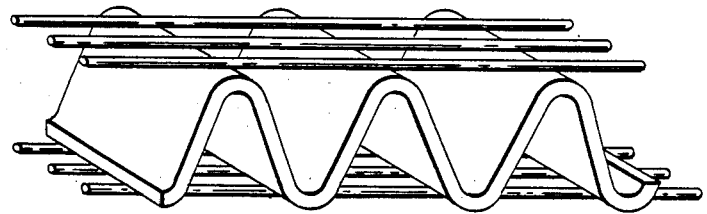
FIG. 8 is a perspective view of an alternative embodiment of the extruded article of the invention except employing straight parallel filaments in place of straight ribbons.

The amplitude of the oscillating undulatable element is primarily dependent upon the slot width of the orifice but it may also be affected by the temperature and necking resulting from take away conditions. The thicker the undulatable element the greater will be the bending radius and hence the overall amplitude of the undulatable element will be larger. If the undulatable element is too thin, it may not bend completely to the straight Extrusion from a die of the type depicted in FIG. 9 will produce an extruded article of the type depicted in FIG. 8.

Figure 10:
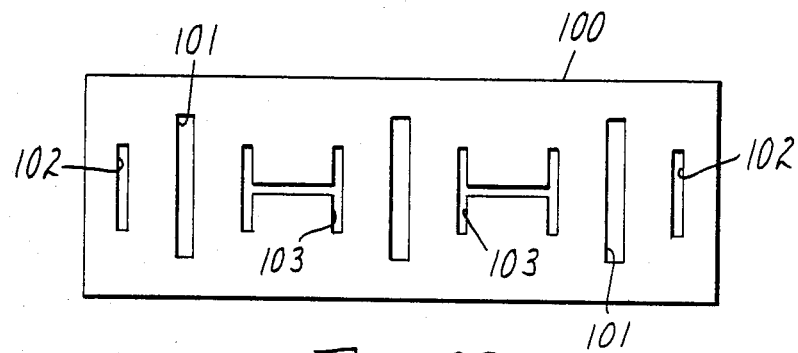

FIG. 10 shows a die 100 having large rectangular openings 101 capable of extruding the undulatable element and, spaced between openings 101, either smaller rectangular openings 102 capable of extruding a rectangular cross-section straight extruded element or H-shaped opening 103 capable of extruding a straight extruded element having an H-shaped cross-section.

Figure 11:
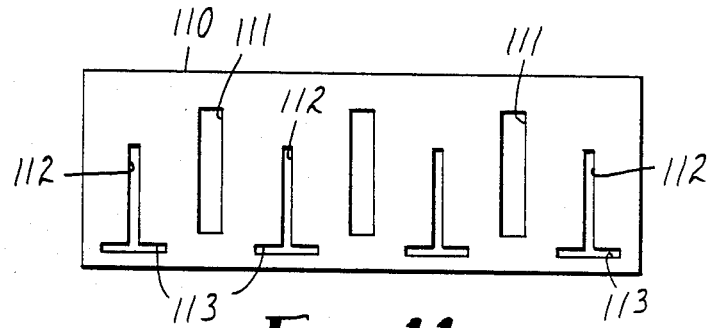

FIG. 11 shows die 110 having large rectangular openings 111 separated by T-shaped openings 112 which are spaced between openings 111 but positioned with the part of the T-shaped opening 113 placed so as to place the top bar of the T-shaped element on the same side on the outer surface of the resultant extruded article.

Figure 12:
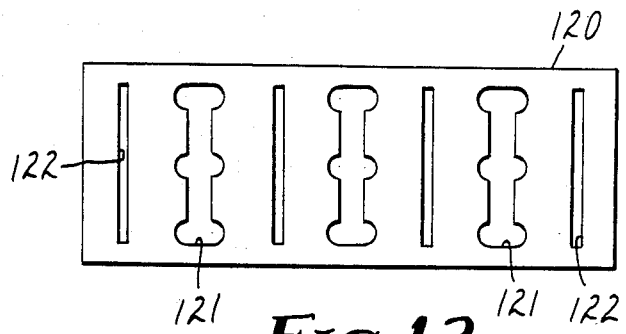

FIG. 12 shows die 120 having an elongate, complex-shaped openings 121 capable of extruding a complex-shaped cross-section undulatable element spaced between rectangular openings 122 capable of extruding a ribbon-like straight extruded element.

Figure 13:
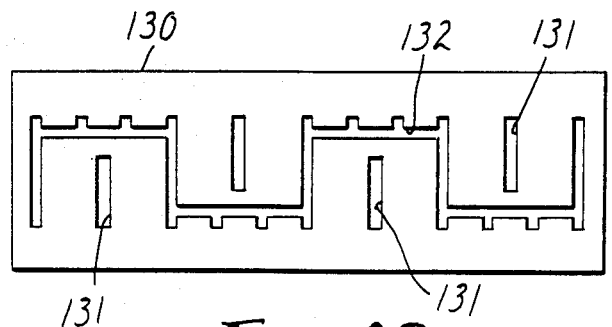

FIG. 13 shows die 130 having rectangular openings 131 spaced between valleys existing between opening 132 so as to provide a continuous straight extruded element rather than multiple elements which separate the undulated element produced by extruding through opening 131. The valleys will be on alternative sides of the extruded article.

Figure 14:
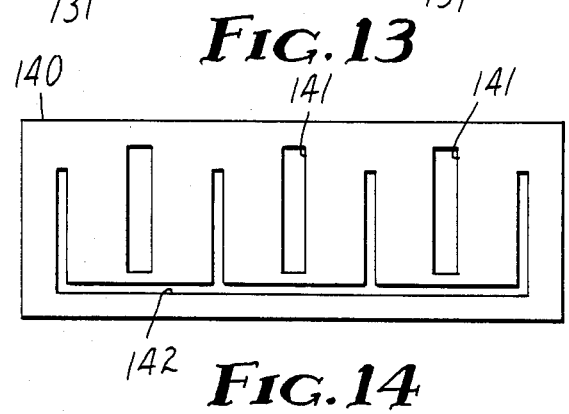

FIG. 14 shows die 140 with rectangular openings 141 positioned between valleys formed by continuous opening 142 with the valleys all being on the same side of the resultant extruded article so as to provide a continuous film on one side of the extruded article which would be desirable in providing a means for collecting dirt, for example as a floor mat, if the continuous film is positioned on the bottom of the mat.

Figure 15:
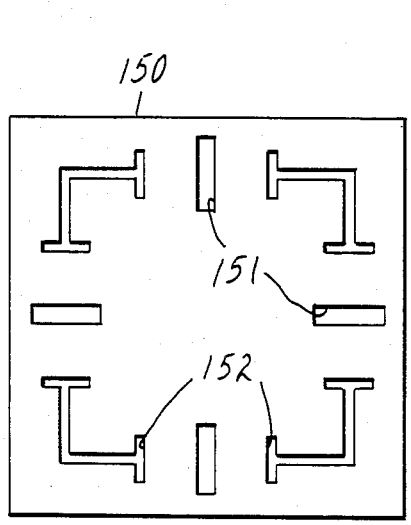

FIG. 15 reveals die 150 having rectangular-shaped extrusion orifices 151 positioned between double T-shaped openings 152 to produce a square-cross-section extruded structure.

Figure 16:
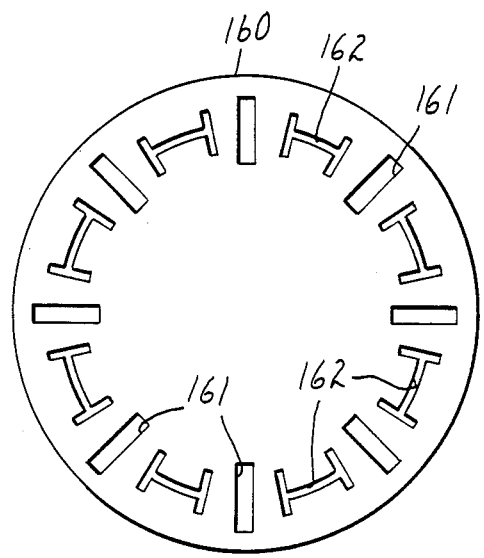

FIG. 16 shows a round extrusion die 160 having rectangular-shaped extrusion orifices 161 for the undulatable element separated by an H-shaped openings 162 to produce a tubular extruded structure.

Figure 17:
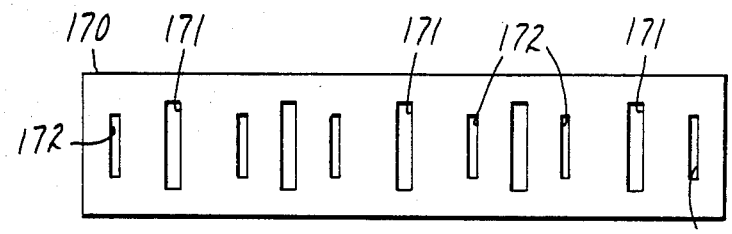

FIG. 17 reveals a die 170 having larger rectangular-shaped orifices 171 separated by smaller rectangular-shaped orifices 172, of the same type as that depicted in FIG. 5, but with variations in spacing as shown.

Figure 18:
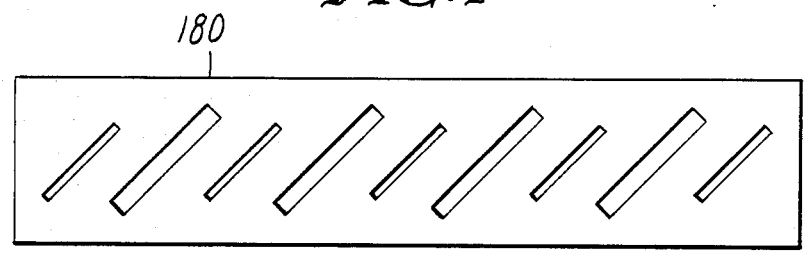

FIG. 18 shows a die 180 which is a modification of die 50 of FIG. 5 except the orifices are positioned at an angle with respect to the rectangular shape of the die.

Figure 19:
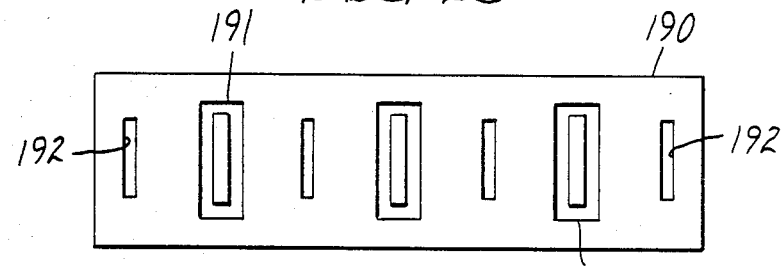

FIG. 19 shows an extrusion die 190 which has larger undulatable element extruding openings 191 having the capability of forming a tubular shape separated by smaller rectangular-shaped orifices 192. A two-component element with a core of a different material such as a different plastic material or perhaps a liquid may be extruded with a similar die. Other core materials are also contemplated.

Figure 20:
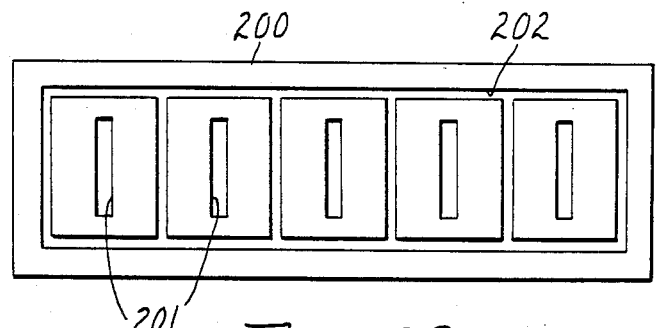

FIG. 20 shows a die 200 including rectangular-shaped orifices 201 to produce the undulatable elements and rectangular tubular-shaped orifice 202 capable of forming a tubular-shaped straight element with compartments in which the undulatable elements will undulate. The structure formed by orifice 202 will be continuous and the undulated element will not be visible unless the structure produced by orifice 202 is transparent.

Figure 21:
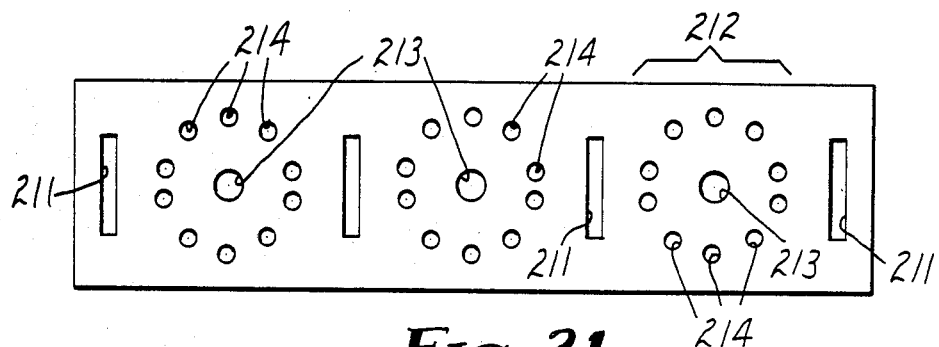

FIG. 21 shows a die 210 including rectangular-shaped orifices 211 for producing the undulatable element separated by opening pattern 212 consisting of a central large diameter opening 213 capable of producing a spiral surrounded by smaller diameter openings 214 capable of producing straight elements. The extruded element produced by opening pattern 212 is according to Fowler, U.S. Pat. No. 4,384,022.

Figure 22:
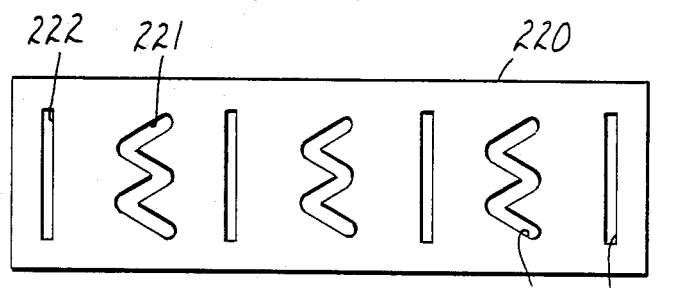

FIG. 22 shows an extrusion die 220 including irregular-shaped openings 221 for producing the undulatable element separated by rectangular-shaped openings 222 for producing the straight elements.

Figure 23:
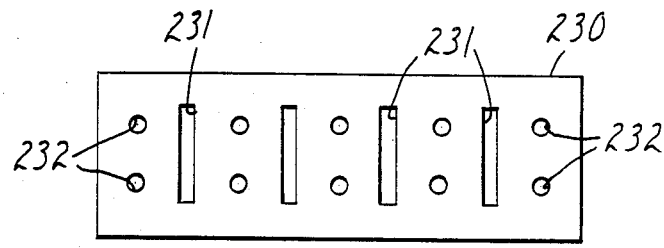

FIG. 23 shows die 230 including rectangular opening 231 separated by dual filament openings 232 which are spaced in alignment between openings 231.

A number of additional secondary process operations may be performed on the extruded article of the invention to further enhance the properties or create entirely different properties. For example, by adding a chemical blowing agent such as azodicarbonamide or any other suitable foam-inducing agent, it is possible to foam some or all of the extruded elements. Foaming may be utilized to alter the material properties of the resultant extruded article (e.g., resiliency, specific gravity, etc.) or its structural dimensions. Foaming tends to swell the final dimensions after extrusion and may affect the thickness of the extruded article as well as elements spacing and frequency.

Figure 24:
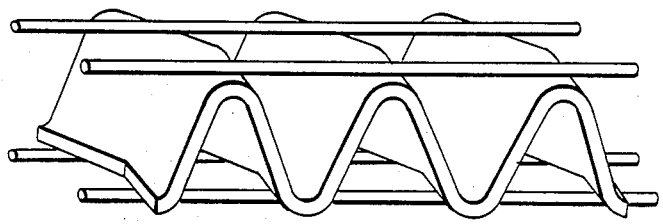
FIG. 24 is a perspective view of a segment of extruded article made in accordance with the present invention by employing a die of the type depicted in FIG. 23 with further modification to cause the ribbon structure to partially collapse.

Furthermore, by simply compressing the extruded article, e.g., of the type made with a die depicted in FIG. 23, while it is still soft before it is completely hardened, also may change its physical properties, for example, to produce a structure a portion of which is shown in FIG. 24. Such compression or deformation alters the undulated element to give it a non-linear cross-section which changes the compression modulus of the final extruded web making the web more resilient.

Figure 25:
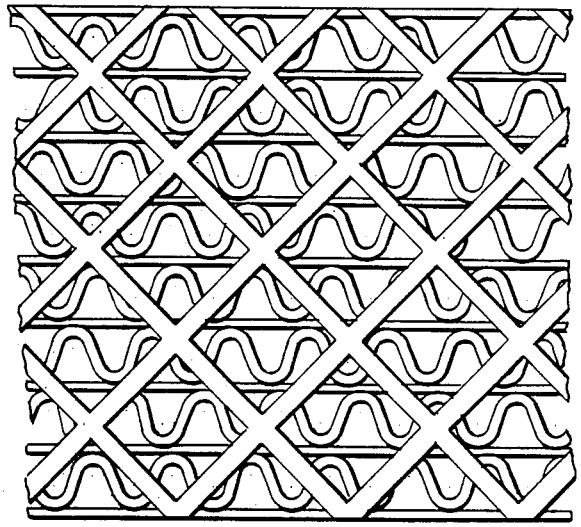
FIG. 25 is a top plan view of an extruded article of the type depicted in FIG. 6 having embossed thereon a crosshatched pattern to provide further structural integrity.

Additionally, it is possible to emboss the extruded article by passing in between patterned or embossing rolls while the material is still soft and not completely hardened or by utilizing heated embossing rolls in the case of a thermoplastic material. Such an embossed article is shown in FIG. 25. This technique may be utilized to reinforce a web significantly in the transverse direction without the use of a bonding agent.

Additionally, an extruded article may be reinforced totally by coating the entire web with an appropriate bonding resin by any of a variety of coating methods (e.g., roll coating, dipping, spraying, etc.) and curing by the appropriate means depending upon the particular bonding resin system.

Figure 26:
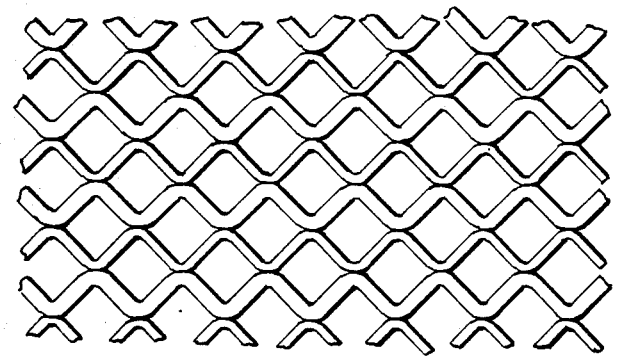
FIG. 26 is a top plan view of a net-like structure made by stretching in the transverse direction an extruded structure of the type depicted in FIG. 6.

The extruded article may also be tentered in the transverse position while it is still soft after extrusion to provide a grid-like structure. For example, the article depicted in FIG. 6 tentered in the transverse direction will produce a web of the type shown in FIG. 26.

The extruded article of the invention may also be modified by laminating it to other preformed elements. For example, the extruded article may be bonded to one or more preformed films or layers to create a sandwich or it may be coated with a different material to change its surface characteristics. For example, the article may be first coated with a binder resin and then flocked with very short, fine, textured fibers to produce a flocked article. Additionally, the binder resin coated web may be coated, while the binder is still tacky, with abrasive material to produce an abrasive article or a friction-surface mat.

A multitude of possible applications exist for the extruded articles of the present invention. Material selection determines whether a rigid structure or flexible, rubbery web is produced. The size of the structure e.g., slot dimensions and slot spacing, greatly influence the appearance, weight and physical properties of the resultant web.

The extruded article of the present invention may find utility as a geotextile component to promote stabilization of soil or drainage, a filter medium used by itself or in combination with other nonwoven mats to produce a laminate, a medium to facilitate heat or mass transfer, a substrate for a nonwoven abrasive article or other abrasive articles, a spacer material, a netting material, a light or material diffuser, a macro fabric, a structural element, a reinforcing member and static mixing element. Other uses are possible depending upon the composition of the extruded elements and their variables.

Almost any thermoplastic material may be utilized to form the extruded article of the present invention. Useful thermoplastic materials include polyolefins, polyamides, thermoplastic polyurethane, polyesters, thermoplastic rubbers, polyvinyl chloride, polysulfone, polyimides, polycarbonates and acrylics. Low melt viscosity materials may be utilized to prepare extruded articles including a relatively small amplitude oscilation in the undulated element but such materials would generally be undesirable for making very large amplitude oscilations in the undulated element. In general, a higher melt viscosity thermoplastic material tends to be more amenable to a wide variety of size ranges. High melt flow polymer is desirable for the formation of small amplitude extruded structures.

It is also possible to control the melt viscosity of the thermoplastic materials by control of the extrusion temperature. Typically, the extrusion temperatures are selected toward the lower limits of the processing temperature range of the polymer. Too high a temperature may restrict the polymer's utility to smaller size extruded structures. Blends of materials and material compounding offer other alternative to controlling the melt strength. Extremely high melt viscosities may cause excessive die swell of the extrudate, i.e., expansion of the extruded element upon exiting the die, and, therefore, may limit their use to structures of large diameters.

As previously mentioned, the filament forming extrudable plastic mass is not restricted to thermoplastic materials, although they are preferred. Useful extrudable materials also include extrudable food compositions (i.e., pasta, candy formulation, cereal compositions and the like), dissolved cellulose slurry, and other extrudable masses.

The extruded article, after extrusion, is converted by a suitable technique to a state where elements no longer bond to one another. Such techniques, besides cooling or freezing, could involve drying, infrared or hot oil setting, radio frequency (RF) or microwave drying, and the like. Heat setting or curing of a thermosetting resin such as a thermosetting polyurethane will provide one means of converting or changing the plastic mass to the state where elements no longer bond to one another. The process may also be utilized to extrude articles from inorganic extrudable masses such as those utilized for the formation of ceramic materials. Such articles would, of course, require drying and firing.

The dies useful in the peparation of the extruded articles of the present invention are relatively simple, merely having the appropriate orifices prepared by machining or drilling.

Figure 7:
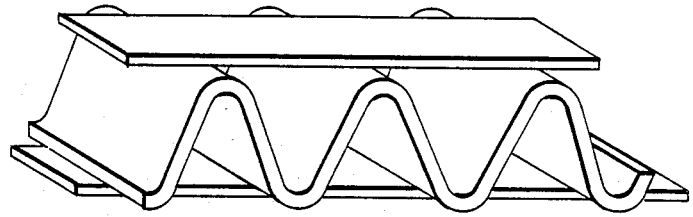
FIG. 7 is a perspective view of the segment of extruded article made in accordance with the present invention by employing a die of the type depicted in FIG. 5, except with fewer openings.

The presently preferred articles according to the present invention are of the type depicted in FIGS. 6 and 7 having a slot width in the range of 0.15 mm to about 1.5 mm with a slot height of about 0.75 mm to about 15 mm. The preferred slot spacing between the undulatable element and the adjacent straight element is about 1 mm to 25 mm. Typical die dimensions have been set forth earlier in Table I.

The dies may be of any length so long as a good flow profile may be maintained across the die length. Flow uniformity is preferred if uniform amplitude and frequency are desired.

As mentioned above, the various extruded elements may have a conventional circular or rectangular cross-section or may be of a relatively complex shape having cross-sections which are H-shaped, U-shaped, X-shaped, or with other variations such as a T, S, Sine wave or Y shape, or a combination of these.

Extrusion conditions may vary according to the material extruded but generally tend to reflect the lower temperature range of processing conditions for the polymer. If the extrusion temperatures are too high, maximum amplitude oscillation for wide spacing may be difficult. Care should be taken to be above the crystallization point of crystalline materials, especially if they are in the lower melt viscosity range.

The shear rate may have an effect on oscillation amplitude, especially if the materials are shear sensitive. In general, as the shear rate is increased, if the material is sensitive, localized shear heating occurs and the material may behave as though it has a lower bending modulus and a lower amplitude oscillation may occur. This may be partially adjusted by reducing die temperatures.

Extrusion temperatures will vary depending upon the particular materials selected. For example, polyvinyl chloride may be extruded in certain grades at 130° C. while nylon and high molecular weight polyethylene are typically extruded at a much higher temperature.

The quenching system plays a significant role in the control and production of a uniform extruded article. To prevent excessive draw down under the weight of the extruded article and thus prevent the formation of the desired structure, the quench medium preferably is located quite close to the die face. The actual distance between the die face and the quench media is dependent upon the size and amplitude of the extruded article being produced, with smaller dimension extruded articles preferably being collected very close to the face of the die, i.e., about 10 to 20 mm, while large dimension extruded articles may be extruded slightly further from the die face, i.e., about 20 to 100 mm. Autogenous bonding between elements is improved if the quench distance is maximized.

The quenched extruded structure is preferably pulled away uniformly to prevent discontinuities in the extruded web. This may be done by a pair of nip rolls having smooth surfaces to provide a slight compression so as to pinch the extruded structure without undue deformation, unless it is desired. It is preferred to employ two sets of nip rolls to provide a more positive drive or pull. A dual nip roll set is particularly preferred when the extruded material tends to be somewhat inflexible. In that situation, the rolls of the first nip roll set are gapped to provide a guiding function without a positive drive since they must be positioned quite close to the die face and yet be under the quench media when the extruded material is at its softest stage and the lower rolls of the nip roll are adjusted to provide a positive driving or pulling influence on the completely quenched material at a point in the process where it is no longer deformable.

In the case of very rigid extruded articles, typically having large dimensions, for example, formed of polypropylene or nylon, a vertical collection system of the type depicted in FIG. 3 may be necessary since bending or rolling of the extrudate may be difficult. This typically consists of multiple pairs of nip rolls, appropriately gapped, at various locations with water sprays to quench the extrudate structure. The extrudate may be required to be cut to provide convenient lengths since it may not be easily rolled without damage.

It is also possible to collect the extrudate on a horizontal belt without a water quench and simply let the material air cool. This greatly enhances the integral bonding of the elements of the extruded article. This process modification is generally limited to materials which will form extruded shapes which will not deform under their own weight after contact with the belt surface.

EXAMPLES

The invention is further illustrated by the following examples wherein all parts are by weight, unless otherwise specified.

EXAMPLE 1

Polyvinyl chloride pellets plasticized to a Shore A hardness of 75 were melt extruded from a 65 mm diameter extruder at a temperature of about 150° to 165° C. into a folded ribbon structure through an extrusion die of the type depicted in FIG. 9 having the following orifice configurations:
Slot width 1.02 mm
Slot length 7.92 mm
Slot spacing 7.92 mm
Hole diameter 1.07 mm
Number of holes 23
Number of slots 72

The resulting web was quenched in a water bath at the rate of 3.0 meters per minute producing a web having a weight of 4 kg/m². The water level was approximately 25 mm from the face of the die.

EXAMPLE 2

The plasticized polyvinyl chloride pellets described in Example 2 were melt extruded in 19 mm diameter extruder into a folded ribbon structure from a die having the configuration depicted in FIG. 23 with the following dimensions:
Slot width 0.25 mm
Slot length 1.02 mm
Slot spacing 1.57 mm
Hole diameter 0.33 mm
Number of holes 36
Number of slots 17.

The extrusion temperature was in the range of 145° to 155° C. The resulting web was quenched in a water bath and the water level was approximately 50 mm from the face of the die.

EXAMPLE 3

The plasticized polyvinyl chloride pellets described in Example 1 were melt extruded employing a 19 mm diameter extruder into a folded ribbon structure using a die having a configuration of the type depicted in FIG. 17 and having the following dimensions:
Slot width (major) 0.76 mm
Slot length (major) 7.92 mm
Slot width (minor) 0.51 mm
Slot length (minor) 5.08 mm
Slot spacing 6.35 mm
Number of major slots 7
Number of minor slots 8

The Extrusion temperature was in the range of 145° to 155° C. The resulting web was quenched in a water bath with the water level being approximately 50 mm from the face of the die.

EXAMPLE 4

The plasticized polyvinyl chloride pellets described in Example 1 were extruded employing a 19 mm diameter extruder into a folded ribbon structure of the type depicted in FIG. 23 with the following die configurations:
Slot width 0.51 mm
Slot length 4.75 mm
Slot spacing 3.18 mm
Hole diameter 0.64 mm
Number of slots 11
Number of holes 24

The extrusion temperature was in the range of 145° to 165° C. The resulting web was collected on a moving belt approximately 50–75 mm from the die face with the belt speed synchronized to match the melt extrusion rate. The web was air cooled without a water quench.

EXAMPLE 5

The plasticized polyvinyl chloride pellets described in Example 1 were tumble mixed with 0.6 weight percent dioctylphthalate plasticizer to wet the surface of the pellets. To the resultant pellets was then added 0.6 percent by weight of azodicarbonamide (a chemical blowing agent sold under the trade designation "Kempore" 200 MC by Stephan Chemical Company) and the mixture was again tumble mixed. The uniformly mixed blend was melt extruded into a folded ribbon through an extrusion die having a configuration of the type depicted in FIG. 9 with dimensions as follows:
Slot width 102 mm
Slot length 7.92 mm
Slot spacing 7.92 mm
Hole diameter 1.04 mm
Number of slots 23
Number of holes 72

The extrusion temperature was in the range of 150° to 165° C. The resulting web was quenched in a water bath at 2.7 meters per minute resulting in a web weighing 4.4 kg/m². The water level was approximately 25 mm from the face of the die. The extruder was 65 mm in diameter.

EXAMPLE 6

Polypropylene pellets having a melt index of 25 were melt extruded into a folded ribbon structure using extrusion die having a configuration as depicted in FIG. 9 with the following dimensions:
Slot width 102 mm
Slot length 7.92 mm
Slot spacing 7.92 mm
Roll diameter 1.07 mm
Number of slots 23
Number of holes 72

The extrusion temperature was in the range of 160° to 180° C. and the resulting web was quenched in a water bath whose water level was approximately 25 mm from the face of the die. A 65 mm extruder was used.

EXAMPLE 7

Pellets of polyethylene ionomer (available under the trade designation "Surlyn" 1601 from the E. I. DuPont Company) were melt extruded using a 65 mm diameter extruder into a folded ribbon structure of the type depicted in FIG. 9 having die dimensions as follows:
Slot width 0.76 mm
Slot length 7.92 mm
Slot spacing 6.35 mm
Roll diameter 1.07 mm
Number of slots 28
Number of holes 87

The extrusion temperature was in the range of 250° to 280° C. The resulting web was quenched in a water bath at 2.5 meters per minute resulting in a web having a weight of 4.1 kg/m$^2$. The water level was approximately 25 mm from the face of the die.

EXAMPLE 8

A pasta-type food product in the shape of a folded ribbon structure was extruded. The pasta dough was prepared by mixing, using a food mixer, in parts by volume 8.0 parts Semolina flour, 1.0 parts water, 2.0 parts whole egg, 0.083 parts olive oil, and 0.042 parts salt. Guar gum at a concentration of 0.1% by weight was also added to the dough mixture to increase body and tackiness of the mixture. These ingredients were mixed and kneaded for approximately 10 minutes prior to extrusion. The resulting pasta dough was extruded using a 51 mm diameter by 300 mm long ram-type extruder at a rate of 50 cm$^3$/minute through an extrusion die of the type depicted in FIG. 5 and having the following slot and hole configuration:
Slot width (major) 2.36 mm
Slot length (major) 7.92 mm
Slot width (minor) 1.09 mm
Slot length (minor) 7.92 mm
Slot spacing 14.73 mm
Number of major slots 1
Number of minor slots 2

The pasta material, as it left the die taking care not to disturb the formation of the folded ribbon structures, was cut in 50-80 mm lengths, dusted with flour, dried and deepfat fried.

EXAMPLE 9

A confectionary was extruded in the shape of a folded ribbon structure. The following ingredients were combined, mixed by hand and heated to 140° C: 3.0 parts granulated sugar, 0.125 parts corn starch, 2.0 parts light corn syrup, 1.0 parts water, by volume. The resulting syrup mass was mixed into 0.5 parts beaten egg whites until a stiff, plastic consistency was obtained. This material was extruded using a ram-type extruder as described in Example 8 at a rate of 50 cm$^3$/minute through the same extrusion die also described in Example 8. The confectionary material as it left the die was cut in 50-80 mm lengths, dusted with powdered sugar and held at refrigerated temperature of about 5° C. for approximately 10 minutes. After refrigeration, the confectionary material may be coated as desired.

EXAMPLE 10

A cookie-type food product was extruded in the shape of a folded ribbon structure. The cookie dough was prepared by blending and mixing 6.0 parts bleached flour, 2.25 parts granulated sugar, 2.0 parts vegetable shortening, 0.75 parts whole egg, 0.0625 parts natural and artificial flavor, 0.021 parts salt, 0.094 parts baking soda, 0.094 parts baking powder, 0.188 parts water and 0.0625 parts non-fat dried milk, all parts by volume. After the ingredients were mixed and the resulting cookie dough was chilled for approximately 1 hour in a refrigerator prior to the extrusion, it was extruded at a rate of 50 cm$^3$/minute using the ram-type extruder die described in Example 8. The cookie dough material as it left the die was cut in 50-80 mm lengths, dusted with flour and baked in a convection oven at 175° C. for 5-7 minutes.

EXAMPLE 11

A snack food product was extruded in the shape of a folded ribbon structure. A moist and elastic flour dough was prepared by mixing and blending in parts by volume 3.0 parts soft wheat flour, 1.0 parts whole wheat flour, 0.125 parts light corn syrup, 0.0625 parts granulated sugar, 0.0625 parts salt, 1.0 parts water, and 0.0625 parts natural and artificial flavor. After the ingredients were mixed, the resulting plastic flour dough was extruded at a rate of 50 cm$^3$/minute using a ram-type extruder and extrusion die of Example 8. The snack-food material as it left the die was cut in 50-80 mm lengths, dusted with flour and heat set (baked) in a convection oven at 175° C. for 10-15 minutes.

EXAMPLE 12

A pastry type food product was extruded in the shape of a folded ribbon structure by blending and mixing in parts by volume 6.0 parts enriched bleached flour, 2.0 parts vegetable shortening, 0.75 parts water, 0.375 parts modified corn starch, 0.0625 parts salt, 0.375 parts light corn syrup, 0.021 parts mono and diglycerides, 0.021 parts sodium casinate, and 0.042 parts coloring agents. These ingredients were mixed and the resulting pastry dough extruded at a rate of 50 cm$^3$/minute using the ram-type extruder and extrusion die of Example 8. The pastry-type food material as it left the die was cut taking care not to disturb the formation of folded ribbon into 50-80 mm lengths, dusted with flour and heat-set in a convection oven at 125° C. for 3-5 minutes.

EXAMPLE 13

Commercially available imitation licorice-type candy strands were melt extruded at 80°-90° C. using a 19 mm extruder into a folded ribbon structure through an extrusion die having a slot and hole configuration depicted in FIG. 23 with dimensions as follows:
Slot width 0.51 mm
Slot length 4.75 mm
Slot spacing 3.16 mm
Hole diameter 0.64 mm
Number of slots 11
Number of holes 24

The imitation licorice-type candy contained the following ingredients: corn syrup, wheat flour, sugar, artificial flavor, citric acid, artificial color, soy lecithin and mineral oil. The candy material was collected on a horizontally moving belt approximately 50-80 mm from the die face having a belt speed synchronized to match the melt extrusion rate where the extruded material was air cooled.

EXAMPLE 14

A ceramic structure was extruded in the shape of a folded ribbon structure. A sparingly moist mud was prepared with 1000 grams of aluminum oxide (designated type RC-122 and sold by Reynolds Aluminum Co.), 200 grams of Georgia No Carbon Clay (available from Engelhard Minerals & Chemicals), 36 grams of polyethylene oxide (sold under the trade designated "Polyox 301" by Union Carbide Corporation), 200 grams of 20% polyvinyl alcohol solution (available from Monsanto as "Gelvatol" 2030) and 100 grams of water. The ingredients were mixed for 15 minutes in a circular roll mill until a plastic consistency was achieved. The resulting plastic clay mass was extruded using a hydraulic 50 mm ramtype extruder. A vacuum was drawn over the clay mass immediately prior to extrusion to remove entrapped air. The extrusion die had slot and hole configurations as follows:

Slot width (major) 1.17 mm
Slot length (major) 7.92 mm
Slot width (minor) 0.76 mm
Slot length (minor) 7.92 mm
Slot spacing 7.92 mm
Number of major slots 2
Number of minor slots 3

The clay mass was extruded at $1.38 \times 10^6$ pascal and room temperature into 200 mm lengths and dried for 2 hours at 38° C. to yield a green ceramic structure. This green ceramic structure was subsequently fired using conventional ceramic procedures at 1500° C. for 2 hours to yield the final ceramic state.

We claim:

1. Method of making an extruded article comprising
   (1) extruding at a first rate a first filament-forming, extrudable plastic mass to form a plurality of spaced, straight continuous parallel elements;
   (2) extruding simultaneously, at a second rate faster than said first extrusion rate and between adjacent spaced, continuous parallel elements, a second filament-forming extrudable plastic mass to form an undulatable element which is thinner than it is wide to provide a cross-section with an aspect ratio of at least two, with the undulatable element being positioned with each opposite face of its wide dimension facing one of said continuous straight parallel elements, the surfaces of said plastic masses having a tacky first physical state which permits said surfaces to bond to one another at points of mutual contact and a second physical state in which subsequent bonding will no longer occur and in which latter state said elements have sufficient structural integrity to maintain their extruded bonded shape;
   (3) while the surfaces of said elements are sufficiently tacky to simultaneously cause bonding therebetween at points of contact, causing said undulatable element to undulate in its thin dimension by permitting contact between a parallel element to form an apex on one side of said undulatable element while maintaining the other adjacent parallel element in sufficiently close proximity to permit subsequent contact between it and the undulating undulatable element to form an opposed apex and to permit repetition of such undulation and subsequent contact to form a plurality of apexes, thereby providing an article having an undulated element with apexes aligned on opposed sides wherein the apexes on one side of the undulated element are bonded to one of said parallel elements and the apexes on the other side of said undulated element are bonded to the other adjacent parallel element; and
   (4) changing or permitting the change of said plastic masses to said second physical state.

2. The method of claim 1 wherein said plastic mass is thermoplastic and said changing is by cooling.

3. The method of claim 1 wherein said first and said second filament-forming extrudable plastic masses have the same composition.

4. The method of claim 1 wherein said straight spaced parallel elements are ribbons.

5. The method of claim 1 wherein said straight spaced parallel elements each comprise a plurality of filaments aligned parallel to the wide dimension of the extruded undulatable element.

6. The method of claim 1 wherein said undulatable element comprises a plurality of extruded filaments aligned in the same plane and closely spaced so as to merge after extrusion.

7. The method of claim 1 wherein a plurality of undulatable elements are extruded each between said parallel elements and the same parallel element is common between adjacent undulated elements.

8. The method of claim 7 wherein said parallel elements and said undulated elements are formed in the same plane with undulations aligned in the same direction.

9. The method of claim 7 wherein said parallel elements and undulated elements are formed into a circular shape.

10. The method of claim 1 wherein said undulatable element has a rectangular cross-section.

11. The method of claim 1 wherein said undulatable element has a hollow core.

12. The method of claim 1 wherein said undulatable element has a core of a composition which is different from the composition of its exterior.

13. The method of claim 1 wherein said straight spaced parallel elements are ribbons which are connected together on their ends by side walls and wide enough so that the side edges of the undulatable element does not contact the side walls connecting said ribbons so that the side walls and ribbons form a complete enclosure around each undulatable element.

14. The method of claim 1 wherein said straight spaced parallel elements are ribbons which are connected together on one end by side walls wide enough so that the side edges of the undulatable element does not contact the side walls connecting said ribbons so that the side walls form a solid layer with said ribbons as walls projecting therefrom with undulated elements between said ribbons.

15. The method of claim 14 including the further step of causing the undulated element to contact the side wall while at least one of the undulated element or side wall is still sufficiently tacky to cause fusion bonding therebetween.

16. The method of claim 1 including the further step of embossing said extruded article to provide thereon an embossed pattern.

17. The method of claim 7 including the further step of stretching said article in the transverse direction to permanently stretch said undulated elements and said parallel elements to form a netlike structure.

18. The method of claim 1 including the further step of passing said article between squeeze rollers before said changing step to permanently slightly deform said undulated element along its wide dimension.

* * * * *

REEXAMINATION CERTIFICATE (1372nd)
United States Patent [19]
Welygan et al.

[11] B1 4,634,485
[45] Certificate Issued  Oct. 16, 1990

[54] EXTRUDED ARTICLE AND METHOD OF MAKING THE SAME

[75] Inventors: Dennis G. Welygan; Ronald O. Zemke, both of St. Paul, Minn.

[73] Assignee: The Minnesota Mining & Manufacturing Co., St. Paul, Minn.

Reexamination Request:
No. 90/001,843, Sep. 12, 1989

Reexamination Certificate for:
Patent No.: 4,634,485
Issued: Jan. 6, 1987
Appl. No.: 768,803
Filed: Aug. 23, 1985

[51] Int. Cl.⁵ .............................................. B32B 31/00
[52] U.S. Cl. .............................. 156/244.11; 264/167; 264/177.1
[58] Field of Search .................. 156/244.11, 244.24, 156/244.12, 244.22; 264/167, 177.1

[56] References Cited
FOREIGN PATENT DOCUMENTS
1195476  6/1965  Fed. Rep. of Germany.
2142752  2/1973  France.
1284471  10/1977  Japan.
1355046  5/1974  United Kingdom.

Primary Examiner—Caleb Weston
Attorney, Agent, or Firm—Donald M. Sell; Richard Francis; Andrew D. Sorensen

[57] ABSTRACT

An article is provided comprising a plurality of straight spaced parallel extruded elements separated by a regularly undulated extruded element having an aspect ratio of at least about two, with undulations having opposed apexes on either side thereof, with apexes on one side of the undulated element being bonded to one of the parallel extruded elements and the apexes on the other side of the undulated element being bonded to the other of said parallel extruded elements. The article is formed by extruding a first filament-forming extrudable plastic mass to form a plurality of straight spaced continuous parallel elements, extruding (at a faster extrusion rate and between adjacent parallel elements) a second filament-forming extrudable plastic mass to form an undulatable element which is thinner than it is wide to provide a cross-section with an aspect ratio of at least about two, causing the undulatable element to undulate in its thin dimension and to bond to the straight spaced continuous parallel elements, and changing or permitting the change of the formed, extruded plastic mass so that subsequent bonding will no longer occur and so that the elements have sufficient structural integrity to maintain their extruded bonded shape.

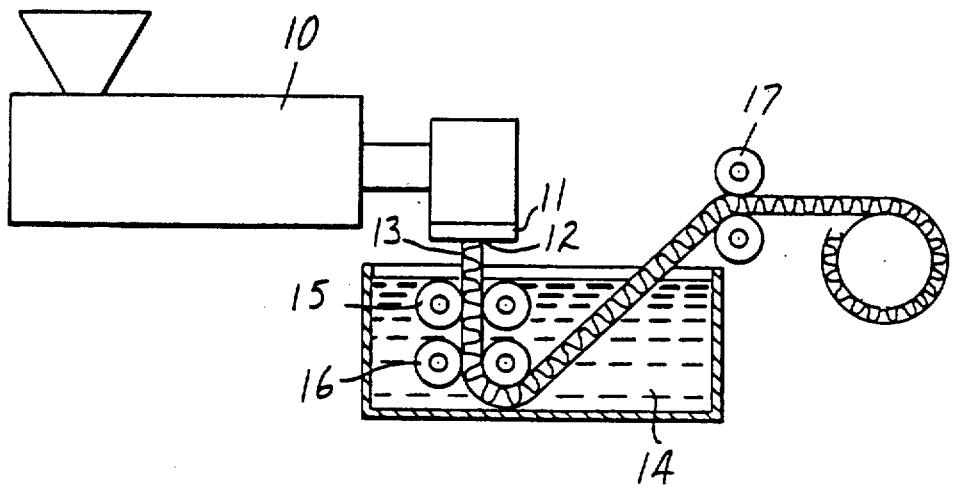

REEXAMINATION CERTIFICATE ISSUED UNDER 35 U.S.C. 307

THE PATENT IS HEREBY AMENDED AS INDICATED BELOW:

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 13 and 14 are determined to be patentable as amended.

Claims 2–12 and 15–18, dependent on an amended claim, are determined to be patentable.

1. Method of making an extruded article comprising
(1) extruding *from a first stationary extruding opening* at a first rate a first filament-forming, extrudable plastic mass to form a plurality of spaced, straight continuous parallel elements;
(2) extruding *from a second stationary extrusion opening* simultaneously, at a second rate faster than said first extrusion rate and between adjacent spaced, continuous parallel elements, a second filament-forming extrudable plastic mass to form an undulatable element which is thinner than it is wide to provide a cross-section with an aspect ratio of at least two, with the undulatable element being positioned with each opposite face of its wide dimension facing one of said continuous straight parallel elements, the surfaces of said plastic masses having a tacky first physical state which permits said surfaces to bond to one another at points of mutual contact and a second physical state in which subsequent bonding will no longer occur and in which latter state said elements have sufficient structural integrity to maintain their extruded bonded shape;
(3) while the surfaces of said elements are sufficiently tacky to simultaneously cause bonding therebetween at points of contact, causing said undulatable element to undulate in its thin dimension by permitting contact between *said undulatable element and* a parallel element [to form] *on one side of said undulatable element which retards the flow of the undulatable element causing it to bend toward the other adjacent parallel element thereby forming* an apex [on one side of said undulatable element] while maintaining the other adjacent parallel element in sufficiently close proximity to permit subsequent contact between it and the undulating undulatable element to form an opposed apex and to permit repetition of such undulation and subsequent contact to form a plurality of apexes, thereby providing an article having an undulated element with apexes aligned on opposed sides wherein the apexes on one side of the undulated element are bonded to one of said parallel elements and the apexes on the other side of said undulated element are bonded to the other adjacent parallel element; and
(4) changing or permitting the change of said plastic masses to said second physical state.

13. The method of claim 1 wherein said straight spaced parallel elements are ribbons which are connected together on their ends by side walls [and], *said ribbons being* wide enough so that the side edges of the undulatable element [does] *do* not contact the side walls connecting said ribbons so that the side walls and ribbons form a complete enclosure around each undulatable element.

14. The method of claim 1 wherein said straight spaced parallel elements are ribbons which are connected together on one end by side walls, *said ribbons being* wide enough so that the side edges of the undulatable element does not contact the side walls connecting said ribbons so that the side walls form a solid layer with said ribbons as walls projecting therefrom with undulated elements between said ribbons.

* * * * *